(12) United States Patent
Zhang (10) Patent No.: US 11,751,039 B2
(45) Date of Patent: Sep. 5, 2023

(54) V2X COMMUNICATION METHOD, APPARATUS, AND STORAGE MEDIUM

(71) Applicant: HUAWEI TECHNOLOGIES CO., LTD., Shenzhen (CN)

(72) Inventor: Hao Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 33 days.

(21) Appl. No.: 17/574,095

(22) Filed: Jan. 12, 2022

(65) Prior Publication Data

US 2022/0141639 A1 May 5, 2022

Related U.S. Application Data

(63) Continuation of application No. PCT/CN2020/102141, filed on Jul. 15, 2020.

(30) Foreign Application Priority Data

Jul. 15, 2019 (CN) .......................... 201910636115.2

(51) Int. Cl.
*H04W 4/90* (2018.01)
*H04W 4/40* (2018.01)
(Continued)

(52) U.S. Cl.
CPC .............. *H04W 4/90* (2018.02); *H04W 4/12* (2013.01); *H04W 4/40* (2018.02); *H04W 28/0284* (2013.01)

(58) Field of Classification Search
CPC ........ G08G 1/166; G08G 1/163; G08G 1/164; G08G 1/096725; G08G 1/0145;
(Continued)

(56) References Cited

U.S. PATENT DOCUMENTS 10,157,539 B1 * 12/2018 Hoover ................ G08G 1/0112
10,237,874 B2 * 3/2019 Mok ................. H04W 36/0072
(Continued)

FOREIGN PATENT DOCUMENTS

CN 107071744 A 8/2017
CN 107846708 A 3/2018
(Continued)

OTHER PUBLICATIONS

R2-1808922 Huawei, HiSilicon, Introduction of eV2X in TS 36.300,3GPP TSG-RAN WG2 Meeting #102,Busan, Korea, May 21-25, 2018,total 14 pages.
(Continued)

*Primary Examiner* — Dung Hong
(74) *Attorney, Agent, or Firm* — HAUPTMAN HAM, LLP (57) ABSTRACT

In a V2X communication method, a first communication device obtains an identification set including one or more identifications, where a risk of collision between a moving subject corresponding to each identification and a first moving subject corresponding to the first communication device meets a preset condition. When a channel busy ratio is greater than a first threshold, the first communication device sends configuration information including the identification set to a second communication device. When the channel busy ratio is greater than a second threshold, the first communication device transmits a V2X message to the second communication device through the standby communication connection channel, where the second threshold is greater than the first threshold.

15 Claims, 4 Drawing Sheets

A first communications device obtains an identifier set, where the identifier set includes one or more identifiers, and a risk of collision between a moving subject corresponding to each identifier in the identifier set and a moving subject corresponding to the first communications device meets a preset condition — 101

When a channel busy ratio of the first communications device is greater than a first threshold, the first communications device sends configuration information of a standby communication connection channel to a second communications device, where the configuration information includes the identifier set, and the configuration information is used for the second communications device to establish a standby communication connection channel with the first communications device after the second communications device determines that an identifier of a moving subject corresponding to the second communications device belongs to the identifier set — 102

When the channel busy ratio is greater than a second threshold, the first communications device transmits a V2X message to the second communications device through the standby communication connection channel, where the second threshold is greater than the first threshold — 103

(51) Int. Cl.
*H04W 4/12* (2009.01)
*H04W 28/02* (2009.01)

(58) Field of Classification Search
CPC ........ G08G 1/0112; G08G 1/16; G08G 1/167;
G08G 1/161; H04W 4/40; H04W 4/46;
H04W 28/0289; H04W 4/90; H04W
28/0284; H04W 92/18; H04W 4/029;
H04W 4/023; H04W 28/02; H04W 4/12;
H04L 41/0816; H04L 41/147; H04L
43/16
See application file for complete search history.

(56) References Cited

U.S. PATENT DOCUMENTS

| | | | | |
|---|---|---|---|---|
| 2018/0234973 | A1* | 8/2018 | Lee | H04W 24/08 |
| 2018/0332564 | A1* | 11/2018 | Lee | H04L 67/12 |
| 2019/0104525 | A1* | 4/2019 | Santhanam | H04L 1/1825 |
| 2019/0297526 | A1* | 9/2019 | Das | H04W 28/0289 |
| 2020/0145867 | A1* | 5/2020 | Tseng | H04W 24/10 |
| 2020/0229194 | A1* | 7/2020 | Belleschi | H04L 5/003 |
| 2021/0329595 | A1* | 10/2021 | Tang | H04W 72/52 |
| 2021/0400509 | A1* | 12/2021 | Lee | H04W 4/40 |

FOREIGN PATENT DOCUMENTS

| | | | | |
|---|---|---|---|---|
| CN | 108024230 | A | 5/2018 | |
| CN | 109565473 | A | 4/2019 | |
| CN | 109661833 | A | 4/2019 | |
| CN | 109792721 | A | 5/2019 | |
| CN | 109803243 | A | 5/2019 | |
| CN | 109804691 | A | 5/2019 | |
| CN | 109845376 | A | 6/2019 | |
| CN | 110460973 | A | 11/2019 | |
| JP | 2009059199 | A | 3/2009 | |
| JP | 2013504231 | A | 2/2013 | |
| JP | 2020535694 | A | 12/2020 | |
| WO | WO-2016045349 | A1 * | 3/2016 | ............ H04W 16/14 |
| WO | 2018113947 | A1 | 6/2018 | |
| WO | 2018168169 | A1 | 9/2018 | |
| WO | 2018175553 | A1 | 9/2018 | |
| WO | 2019036863 | A1 | 2/2019 | |
| WO | 2019064228 | A2 | 4/2019 | |
| WO | 2019126669 | A1 | 6/2019 | |
| WO | WO-2020191785 | A1 * | 10/2020 | ........ H04W 28/0268 |

OTHER PUBLICATIONS

R2-1701177, Qualcomm Incorporated, Summary of [96#60][LTE/V2X] on V2P, 3GPP TSG-RAN WG2 Meeting #97, Athens, Greece, Feb. 13-17, 2017, total 18 pages.
Cooperative intelligent transportation system vehicle communication system application layer and application data exchange standard, 2017, with the English Translation, total 84 pages.
SAE J2735 Standard: Applying the Systems Engineering Process, www.its.dot.gov/index.htm, Final Report—Jan. 2013, total 22 pages.
Conformance test specifications for SAE J2945/1-On-board System Requirements for V2V Safety Communications, Test Suite Structure and Test Purposes (TSS and TP), 2017, total 50 pages.
International Search Report issued in corresponding International Application No. PCT/CN2020/102141, dated Oct. 21, 2020, pp. 1-10.
Extended European Search Report issued in corresponding European Application No. 20841463.1, dated Jun. 15, 2022, pp. 1-11.
Chinese Notice of Allowance issued in corresponding Chinese Application No. 201910636115.2, dated Aug. 26, 2020, pp. 1-4.
Chinese Office Action issued in corresponding Chinese Application No. 201910636115.2, dated May 26, 2020, pp. 1-6.
Japanese Office Action issued in corresponding Japanese Application No. 2022-502531, dated Feb. 27, 2023, pp. 1-5.

* cited by examiner

```
┌─────────────────────────────────────────────────────────────────┐
│ A first communications device obtains an identifier set, where │─── 101
│ the identifier set includes one or more identifiers, and a risk │
│ of collision between a moving subject corresponding to each    │
│ identifier in the identifier set and a moving subject           │
│ corresponding to the first communications device meets a        │
│ preset condition                                                │
└─────────────────────────────────────────────────────────────────┘
                                │
┌─────────────────────────────────────────────────────────────────┐
│ When a channel busy ratio of the first communications device is │
│ greater than a first threshold, the first communications device │
│ sends configuration information of a standby communication     │
│ connection channel to a second communications device,          │─── 102
│ where the configuration information includes the identifier set,│
│ and the configuration information is used for the second       │
│ communications device to establish a standby communication     │
│ connection channel with the first communications device after  │
│ the second communications device determines that an identifier │
│ of a moving subject corresponding to the second communications │
│ device belongs to the identifier set                            │
└─────────────────────────────────────────────────────────────────┘
                                │
┌─────────────────────────────────────────────────────────────────┐
│ When the channel busy ratio is greater than a second threshold, │─── 103
│ the first communications device transmits a V2X message to the │
│ second communications device through the standby communication │
│ connection channel, where the second threshold is greater than │
│ the first threshold                                             │
└─────────────────────────────────────────────────────────────────┘
```

FIG. 1

```
┌─────────────────────────────────────────────────────────────────┐
│ A first communications device obtains target information, where │─── 201
│ the target information includes motion data of a first moving  │
│ subject and motion data of each of one or more moving subjects │
│ included in a first set                                         │
└─────────────────────────────────────────────────────────────────┘
                                │
┌─────────────────────────────────────────────────────────────────┐
│ The first communications device determines, based on the target │─── 202
│ information, whether a risk of collision between the first      │
│ moving subject and each moving subject in the first set meets   │
│ a preset condition                                              │
└─────────────────────────────────────────────────────────────────┘
                                │
┌─────────────────────────────────────────────────────────────────┐
│ The first communications device records an identifier of a      │─── 203
│ moving subject that is in the first set and whose risk of       │
│ colliding with the first moving subject meets the preset        │
│ condition, to obtain an identifier set                          │
└─────────────────────────────────────────────────────────────────┘
```

FIG. 6

V2X COMMUNICATION METHOD, APPARATUS, AND STORAGE MEDIUM

CROSS-REFERENCE TO RELATED APPLICATIONS

This application is a continuation of International Patent Application No. PCT/CN2020/102141 filed on Jul. 15, 2020, which claims priority to Chinese Patent Application No. 201910636115.2 filed on Jul. 15, 2019. The disclosures of the aforementioned applications are hereby incorporated by reference in their entireties.

TECHNICAL FIELD

Embodiments of this application relates to the field of internet of vehicles technologies, and furthermore, to a V2X communication method, apparatus, and a storage medium.

BACKGROUND

With the emergence of vehicle to everything (vehicle to everything, V2X) communication technology, a cellular vehicle to everything (cellular vehicle to everything, C-V2X) communication technology will serve as an important on-site interconnection technology for roads, to provide communication support for an active safety action technology and a passive safety action technology of self-driving. In the future, all vehicles on roads will have the C-V2X communication technology, to implement trans-horizon road and vehicle awareness, and perform avoidance and warning actions related to active safety. Therefore, reliability and a capacity will become the key factors to the maturity of the C-V2X technology.

A basic safety message (basic safety message, BSM) is safety-related basic information that is broadcast by each vehicle in a V2X communication process, and may include information such as a vehicle driving speed, a course, a location, an acceleration, a predicted path and a historical path, and a vehicle time. When driving on a road, a vehicle periodically sends its basic safety message. Because the current C-V2X frequency bandwidth is only 10 M/20 M, in a congested road scenario, in case a quantity of vehicles on the road reaches a threshold, channel resource consumption of the vehicles on the congested road is pretty high, therefore all the preset available channel resources of a V2X access layer will be quickly exhausted, which leading to a channel congestion problem. Channel congestion may lead to a problem that a vehicle fails to receive, in real time, a basic safety message that is broadcast by another vehicle. As a result, vital failure may occur when a V2X safety application of the vehicle calculating and determining a threat on the road.

The 3rd generation partnership project (3rd generation partnership project, 3GPP) alleviates the channel congestion problem by using the following channel control method: Different priorities are set for different V2X services of vehicles, and then different channel busy ratio (channel busy ratio, CBR) thresholds are set for the V2X services having different priorities. When a channel busy ratio of a vehicle reaches a channel busy ratio threshold corresponding to a V2X service having a particular priority, data transmission of the V2X service having this priority is limited. However, when the channel busy ratio reaches up to 60%, sending resource usage of services corresponding to all priorities is limited. As a result, the channel control method can alleviate, only to some extent, a problem caused by mild channel congestion. When a channel busy ratio of a vehicle is relatively high, there is still a possibility that a high safety pre-determining failure risk is caused because the vehicle cannot receive, in real time, basic safety message broadcasted by other vehicles, and the vehicle and its driver are still exposed to a particular safety hazard.

SUMMARY

Embodiments of this application provide a V2X communication method, so that when channel congestion occurs during V2X communication, transmission of a V2X message between moving subjects can be ensured, to reduce a safety pre-determining failure risk of the moving subjects.

A first aspect of this application provides a V2X communication method. The method may be applied to the field of an internet of vehicles, and includes: A first communication device obtains an identification set, where the identification set includes one or more identifications, a risk of collision between a moving subject corresponding to each identification and a first moving subject corresponding to the first communication device meets a preset condition, the moving subject may be a vehicle, an aircraft, a satellite, a mobile phone, or the like, the identification of the moving subject is identity information uniquely indicating the moving subject, and the identity information may indicate various information related to the moving subject, for example, a model and a size of the moving subject. When a channel busy ratio of the first communication device is greater than a first threshold, the first communication device sends configuration information of a standby communication connection channel to a second communication device, where the configuration information includes the identification set, and the configuration information is used for the second communication device to establish the standby communication connection channel with the first communication device after the second communication device determines that an identification of a moving subject corresponding to the second communication device belongs to the identification set, and the configuration information may further include information of another type. When the channel busy ratio is greater than a second threshold, the first communication device transmits a V2X message to the second communication device through the standby communication connection channel, where the V2X message includes motion data of the moving subject, and for example, is a basic safety message (basic safety message, BSM) message, the motion data may include various information related to motion safety of the moving subject, for example, a course, a location, a speed, or a size of the moving subject, the V2X message may further include a message of another type, for example, V2X packet information, and the second threshold is greater than the first threshold, for example, the first threshold may be 30%, the second threshold may be 60%.

It can be learned from the first aspect that the first communication device obtains, in real time, the identification set of the identification of the moving subject whose risk of colliding with the first moving subject meets the preset condition, when the channel busy ratio reaches the first threshold, the first communication device establishes the standby communication connection channel with the corresponding moving subject in the identification set, and when the channel busy ratio reaches the relatively high second threshold, the first communication device transmits the V2X message through the pre-established standby communication connection channel, to ensure that when channel congestion occurs during V2X communication, moving subjects can still communicate with each other, thereby reducing a risk of a safety pre-determining failure of the moving subjects.

In some embodiments, with reference to the first aspect, in a first possible implementation, that the first communication device obtains the identification set includes: The first communication device obtains target information, where the target information includes motion data of the first moving subject and motion data of each moving subject in a first set, and the motion data of the moving subject includes various data related to motion of the moving subject, for example, a moving direction, a location, a speed, or a size of the moving subject. For example, the moving subject is a vehicle. The motion data of the first moving subject is obtained by the first communication device by using various sensors disposed in the moving subject such as a transmitter sensor, a wheel sensor, and a brake sensor, and by using a collection apparatus disposed in the moving subject such as a GPS, a camera, or a radar. After obtaining data of the moving subject from each collection apparatus of the moving subject, the first communication device parses the data of the moving subject, to obtain the motion data of the first moving subject. The first communication device determines, based on the target information, whether a risk of collision between the first moving subject and each moving subject in the first set meets the preset condition. The first communication device determines an identification of a moving subject that is in the first set and whose risk of colliding with the first moving subject meets the preset condition, to obtain the identification set. The first communication device may set a cycle length, for example, every 100 milliseconds is one cycle. The first communication device obtains the identification set once in each cycle, to ensure timeliness and effectiveness of data.

In some embodiments, with reference to the first possible implementation of the first aspect, in a second possible implementation, that the first communication device determines, based on the target information, whether the risk of collision between the first moving subject and each moving subject in the first set meets the preset condition includes: The first communication device determines, based on the target information, a moving subject that is in the first set and that has a risk of colliding with the first moving subject, to obtain a second set. The first communication device determines a predicted path of the first moving subject and a predicted path of a second moving subject, where the second moving subject is any one of one or more moving subjects included in the second set. The first communication device determines a neighboring area of the first moving subject based on the predicted path of the first moving subject, where the neighboring area is a braking area of the first moving subject. The first communication device determines, based on the predicted path of the second moving subject and the neighboring area, whether the second moving subject is to enter the neighboring area, where the neighboring area is in a changing state in a moving process of the first moving subject. An internet of vehicles scenario is used as an example. When the first moving subject is a vehicle, the neighboring area of the first moving subject is an area of the first moving subject that uses, as a center, a location of the first moving subject at a braking start moment when the first moving subject suddenly brakes forcibly in a driving process and on which the first moving subject horizontally moves at all angles when a speed of the first moving subject decreases to 0. If the second moving subject is to enter the neighboring area, the first communication device determines predicted time duration after which the second moving subject is to enter the neighboring area, and determines whether the predicted time duration is less than a third threshold, where the predicted time duration is time duration from a current moment to a moment when the second moving subject enters the neighboring area as predicted. For example, the first communication device predicts that the second moving subject is to enter the neighboring area of the first moving subject after 10 s, and the predicted time duration is 10 s. If the predicted time duration is less than the third threshold, the first communication device determines that a risk of collision between the second moving subject and the first moving subject meets the preset condition.

It can be learned from the second possible implementation of the first aspect that the first communication device first may filter out, from the first set, a moving subject that has no risk of colliding with the first moving subject, to reduce a calculation amount and improve system performance. Then, the first communication device performs path prediction and analysis on the first moving subject and a moving subject that has a risk of colliding with the first moving subject in the second set. Finally, the first communication device determines whether a risk of collision between each moving subject in the second set and the first moving subject meets the preset condition. Accurate setting of the preset condition not only can ensure data accuracy, but also can effectively determine an identification set corresponding to a moving subject with which a standby communication connection channel needs to be established, to reduce a waste of data traffic to some extent during subsequent communication performed through the standby communication connection channel.

In some embodiments, with reference to the second possible implementation of the first aspect, in a third possible implementation, before the first communication device transmits the V2X message to the second communication device through the standby communication connection channel when the channel busy ratio is greater than the second threshold, the method further includes: When the channel busy ratio is greater than the second threshold, the first communication device determines whether the predicted time duration expires. Correspondingly, that the first communication device transmits the V2X message to the second communication device through the standby communication connection channel when the channel busy ratio is greater than the second threshold includes: The first communication device transmits the V2X message to the second communication device through the standby communication connection channel when the channel busy ratio is greater than the second threshold and the predicted time duration expires.

In some embodiments, with reference to any one of the first aspect and the first to the third possible implementations of the first aspect, in a fourth possible implementation, the configuration information further includes an enabling time of the standby communication connection channel, and before the first communication device transmits the V2X message to the second communication device through the standby communication connection channel when the channel busy ratio is greater than the second threshold, the method further includes: When the channel busy ratio is greater than the second threshold, the first communication device determines whether the enabling time arrives. Correspondingly, that the first communication device transmits the V2X message to the second communication device through the standby communication connection channel when the channel busy ratio is greater than the second threshold includes: The first communication device transmits the V2X message to the second communication device through the standby communication connection channel when the channel busy ratio is greater than the second threshold and the enabling time arrives.

In some embodiments, with reference to any one of the first aspect and the first to the fourth possible implementations of the first aspect, in a fifth possible implementation, the configuration information further includes a communication validity time, and after the first communication device transmits the V2X message to the second communication device through the standby communication connection channel, the method further includes: The first communication device determines whether the communication validity time expires, where there may be an association relationship between the communication validity time and the third threshold. For example, if the third threshold is 10 s, the communication validity time may be the same as a value of the third threshold, and also is 10 s. If the communication validity time expires, the first communication device deletes the standby communication connection channel.

In some embodiments, with reference to any one of the first aspect and the first to the fifth possible implementations of the first aspect, in a sixth possible implementation, the configuration information further includes one or more of identification information of the first moving subject, a communication protocol type, a connection protocol type, a delay parameter, and address information.

A second aspect of this application provides a communication device. The communication device has a function of implementing the method in any one of the first aspect and the possible implementations of the first aspect. The function may be implemented by using hardware, or may be implemented by hardware executing corresponding software. The hardware or software includes one or more modules corresponding to the foregoing function.

A third aspect of this application provides a computer device. The communication device includes a processor and a computer readable storage medium that stores a computer program. The processor is coupled to the computer readable storage medium, and when the computer program is executed by the processor, the V2X communication method provided in any one of the first aspect and the possible implementations of the first aspect is implemented.

A fourth aspect of this application provides a non-transitory computer readable storage medium. The computer readable storage medium stores instructions, and when the instructions are run on a computer device, the computer device is enabled to perform the V2X communication method in any one of the first aspect and the possible implementations of the first aspect.

A fifth aspect of this application provides a computer program product including instructions. When the computer program product is run on a communication device, the communication device is enabled to perform the V2X communication method in any one of the first aspect and the possible implementations of the first aspect.

According to the V2X communication method provided in some embodiments of the instant application, the first communication device obtains, in real time, the identification set of the identification of the moving subject whose risk of colliding with the first moving subject meets the preset condition, when the channel busy ratio reaches the first threshold, the first communication device establishes the standby communication connection channel with the corresponding moving subject in the identification set, and when the channel busy ratio reaches the relatively high second threshold, the first communication device transmits the V2X message through the pre-established standby communication connection channel, to ensure that when channel congestion occurs during V2X communication, V2X messages can still be transmitted between moving subjects, thereby reducing a risk of a safety pre-determining failure of the moving subjects.

BRIEF DESCRIPTION OF DRAWINGS

FIG. 1 is a flow chart of a V2X communication method according to at least one embodiment of this application;

FIG. 2 is a flow chart of an identification set obtaining method according to at least one embodiment of this application;

DESCRIPTION OF EMBODIMENTS

The following describes example embodiments of the instant application with reference to the accompanying drawings. The described embodiments are merely some rather than all of the embodiments of the instant application. A person of ordinary skill in the art may learn that with evolution of an internet of vehicles technology and emergence of a new application scenario, the technical solutions provided in embodiments of the instant application are also applicable to a similar technical problem.

Some embodiments of the instant application provide a V2X communication method. A first communication device obtains, in real time, an identification set of an identification of a moving subject whose risk of colliding with a first moving subject meets a preset condition, when a channel busy ratio reaches a first threshold, the first communication device establishes a standby communication connection channel with a corresponding moving subject in the identification set, and when the channel busy ratio reaches a relatively high second threshold, the first communication device transmits a V2X message through the pre-established standby communication connection channel, to ensure that when channel congestion occurs during V2X communication, V2X messages can still be transmitted between moving subjects, thereby reducing a risk of a safety pre-determining failure of the moving subjects. Some embodiments of the instant application further provide a corresponding apparatus and a storage medium. Details are separately described in the following.

FIG. 1 is a flow chart of a V2X communication method according to at least one embodiment of this application.

Referring to FIG. 1, the V2X communication method provided in some embodiments of this application may include the following steps.

101. A first communication device obtains an identification set, where the identification set includes one or more identifications, and a risk of collision between a moving subject corresponding to each identification and a first moving subject corresponding to the first communication device meets a preset condition.

Some embodiments of the application may be applied to an internet of vehicles scenario, and the moving subject may be a vehicle driving on a road.

Considering an exemplified internet of vehicles scenario. When the first moving subject drives on a road, there may be a plurality of moving subjects around the first moving subject. Some moving subjects may have different degrees of risks of colliding with the first moving subject, and the other moving subject may have no risk of colliding with the first moving subject.

In some embodiments of the application, the first communication device first obtains the identification set, the identification set includes one or more identifications, and the risk of collision between the moving subject corresponding to each of the one or more identifications and the first moving subject meets the preset condition.

In some embodiments of the application, the identification of the moving subject is identity information uniquely indicating the moving subject. For example, if the moving subject is a vehicle on a road, the identity information may indicate various information related to the vehicle, for example, a model and a size of the vehicle. In some embodiments of this application, the risk of collision between the moving subject corresponding to each identification in the identification set and the first moving subject is greater than the preset condition. It should be noted that in some embodiments of this application, there may be different methods for representing a risk of collision between the one moving subject and another moving subject, and corresponding preset conditions may be different based on the different representation methods. Therefore, the preset condition is not limited in some embodiments of this application.

It should be noted that in addition to the internet of vehicles scenario, embodiments of this application may be further applied to other traffic scenarios. Therefore, in addition to the vehicle, the moving subject in some embodiments of this application may be other moving subjects such as an aircraft or a satellite. In addition, a person carrying an electronic device such as a mobile phone or a sports bracelet may also be the moving subject in some embodiments of this application. This is not limited in some embodiments of this application.

102. When a channel busy ratio of the first communication device is greater than a first threshold, the first communication device sends configuration information of a standby communication connection channel to a second communication device, where the configuration information includes the identification set, and the configuration information is used for the second communication device to establish a standby communication connection channel with the first communication device after the second communication device determines that an identification of a moving subject corresponding to the second communication device belongs to the identification set.

In some embodiments of this application, the first communication device monitors the channel busy ratio of the first communication device in real time. When detecting that the channel busy ratio of the first communication device is greater than the first threshold, the first communication device sends the configuration information of the standby communication connection channel to the second communication device, where the configuration information includes the identification set. In some embodiments of this application, the second communication device is a communication device, for example, a vehicle-mounted terminal, corresponding to any moving subject in a communication range of the first moving subject. The configuration information sent by the first communication device to the second communication device may be sent through road broadcasting. After receiving communication the configuration information through road broadcasting, the second communication device first determines whether the identification of the moving subject corresponding to the second communication device belongs to the identification set included in the configuration information, and if the identification belongs to the identification set, the second communication device establishes the standby communication connection channel with the first communication device based on the configuration information.

In some embodiments, in addition to the identification set, the configuration information sent by the first communication device to the second communication device may further include one or more of identification information of the first moving subject, a communication protocol type {for example, a user datagram protocol (user datagram protocol, UDP) or a transmission control protocol (transmission control protocol, TCP)}, a network connection type (for example, a 3G/4G/5G communication connection), a delay parameter, address information {an IP address (for example, an IPv4 address or an IPv6 address), a media access control (media access control, MAC) address, or the like}, and the like. It should be noted that the configuration information may further include information of another type, for example, an enabling time of the standby communication connection channel, a communication validity time, a port number, a vehicle password, an application ID, layer-2, or an international mobile equipment identity (International Mobile Equipment Identity, IMEI). An information type included in the configuration information is not limited in some embodiments of this application.

103. When the channel busy ratio is greater than a second threshold, the first communication device transmits a V2X message to the second communication device through the standby communication connection channel, and the second threshold is greater than the first threshold.

In some embodiments of this application, when the channel busy ratio of the first communication device reaches the second threshold, the first communication device transmits the V2X message to the second communication device through the established standby communication connection channel. In some embodiments of this application, the V2X message may include various motion data related to motion safety of the moving subject, for example, a heading, a location, a speed, or a size of the moving subject, and for example, is a basic safety message (basic safety message, BSM). In addition, the V2X message may further include other information, such as another type of V2X packet information. This is not limited in some embodiments of this application.

In some embodiments, when the first communication device determines that the channel busy ratio reaches the second threshold, it first sends its motion data to the second communication device through the standby communication connection channel, after receiving the motion data of the first moving subject through the standby communication connection channel, the second communication device also starts to send motion data of the moving subject corresponding to the second communication device to the first communication device through the standby communication connection channel Types of V2X messages exchanged between the first communication device and the second communication device are not limited in some embodiments of this application.

In some embodiments of this application, both the second threshold and the first threshold are preset, and the second threshold is greater than the first threshold. For example, the first threshold may be 30%, and the second threshold may be 60%.

In some embodiments, if the configuration information further includes an enabling time of the standby communication connection channel, when the channel busy ratio is greater than the second threshold, the first communication device first needs to determine whether the enabling time arrives, and if the enabling time arrives, the standby communication connection channel between the first communication device and the second communication device is enabled, and the V2X message is transmitted through the standby communication connection channel.

In some embodiments of this application, the first communication device obtains, in real time, the identification set of the identification of the moving subject whose risk of colliding with the first moving subject meets the preset condition, when the channel busy ratio reaches the first threshold, the first communication device establishes the standby communication connection channel with the moving subjects corresponding to the identification set respectively, and when the channel busy ratio reaches the relatively high second threshold, the first communication device transmits the V2X message through the pre-established standby communication connection channel, to ensure that when channel congestion occurs during V2X communication, motion data can still be transmitted between moving subjects, thereby reducing a risk of a safety prediction failure of a moving subject.

Based on FIG. 1, a method for obtaining, by the first communication device, the identification set in step 101 is described in some embodiments of this application. FIG. 2 is a flow chart of an identification set obtaining method according to some embodiments of this application.

As shown in FIG. 2, the method for obtaining, by the first communication device, the identification set provided in some embodiments of this application may include the following steps.

201. The first communication device obtains target information, the target information includes the motion data of the first moving subject and motion data of each of one or more moving subjects included in a first set.

In some embodiments of this application, the first communication device first needs to obtain the target information. The target information includes the motion data of the first moving subject and the motion data of each moving subject in the first set. In some embodiments of this application, the motion data of the moving subject includes various data related to motion of the moving subject, for example, a moving direction, a location, a speed, or a size of the moving subject.

In some embodiments, for example, the first moving subject is a vehicle. The motion data of the first moving subject is obtained by the first communication device by using various sensors disposed in the vehicle such as a transmitter sensor, a wheel sensor, and a brake sensor, and by using a collection apparatus disposed in the vehicle such as a GPS, a camera, or a radar. After obtaining data of the vehicle from each collection apparatus of the vehicle, the first communication device parses the data of the vehicle, to obtain the motion data of the vehicle. The motion data may include information such as a course, location coordinates, a vehicle size, or a steering wheel angle of the vehicle.

In some embodiments of this application, the first set includes one or more moving subjects, and the first communication device may receive motion data sent by a communication device corresponding to the one or more moving subjects through road broadcasting, for example, a BSM message. It should be noted that a sequence of obtaining, by the first communication device, the motion data of the first moving subject and the motion data of each moving subject in the first set is not limited in some embodiments of this application.

202. The first communication device determines, based on the target information, whether a risk of collision between the first moving subject and each moving subject in the first set meets the preset condition.

In some embodiments of this application, after obtaining the target information, namely, the motion data of the first moving subject and the motion data of each moving subject in the first set, the first communication device analyzes the motion data of the first moving subject and the motion data of each moving subject in the first set, to determine the risk of collision between the first moving subject and each moving subject in the first set, and determine whether the risk of collision between the first moving subject and each moving subject in the first set meets the preset condition.

In some embodiments of this application, there are a plurality of methods for evaluating the risk of collision between the first moving subject and each moving subject in the first set. For example, the risk of collision between the first moving subject and each moving subject in the first set may be calculated by using a target classification algorithm and a path prediction algorithm. In addition, calculation may be performed by using another similar or related mathematical calculation method. This is not limited in some embodiments of this application.

Figure 3:
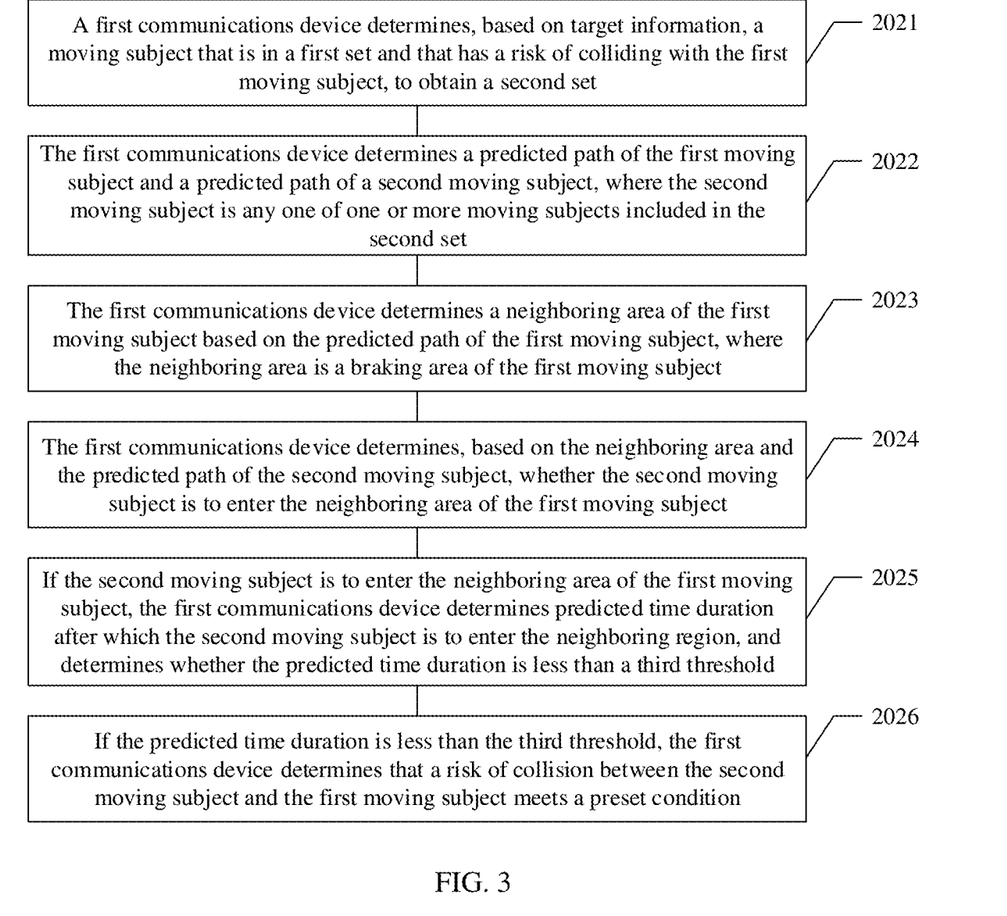
FIG. 3 is a flow chart of a process for determining whether a risk of collision between a first moving subject and each moving subject in a first set meets a preset condition according to at least one embodiment of this application.

In some embodiments, the first communication device may analyze the motion data of the first moving subject and the motion data of each moving subject in the first set by using the target classification algorithm and the path prediction algorithm, to determine whether the risk of collision between the first moving subject and each moving subject in the first set meets the preset condition. This process, according to some embodiments of this application, will be described with respect to FIG. 3. It should be understood that the embodiment in FIG. 3 is merely example description, and should not be construed as a limitation on this application.

203. The first communication device determines an identification of a moving subject that is in the first set and whose risk of colliding with the first moving subject meets the preset condition, to obtain the identification set.

In some embodiments of this application, after analyzing and determining the risk of collision between each moving subject in the first set and the first moving subject, the first communication device determines the identification of the moving subject whose risk of colliding with the first moving subject meets the preset condition, to obtain the identification set.

It should be noted that in some embodiments of this application, the first communication device may set a cycle length, for example, every 100 milliseconds may be one cycle. The first communication device obtains the identification set once in each cycle, to ensure real time and effectiveness of data.

Based on some embodiments according to FIG. 2, a method for determining whether the risk of collision between the first moving subject and each moving subject in the first set meets the preset condition is described. FIG. 3 is a flow chart of a process for determining whether the risk of collision between the first moving subject and each moving subject in the first set meets the preset condition.

Referring to FIG. 3, the process of determining whether the risk of collision between the first moving subject and each moving subject in the first set meets the preset condition may include the following steps.

2021. The first communication device determines, based on the target information, a moving subject that is in the first set and that has a risk of colliding with the first moving subject, to obtain a second set.

In some embodiments of this application, some moving subjects in the first set may be unrelated to motion of the first moving subject, that is, there is no motion risk. Therefore, in some embodiments of this application, the first communication device first determines, based on the target information, the moving subjects that is in the first set that has the risk of colliding with the first moving subject, to obtain the second set.

In some embodiments, the first communication device may determine, by using the target classification algorithm, the moving subject that is in the first set and that has the risk of colliding with the first moving subject.

In some embodiments, the first communication device using the target classification algorithm to determine a relative location relationship between each moving subject in the first set and the first moving subject based on the motion data of the first moving subject and the motion data of each moving subject in the first motion set, and to classify the moving subject in the first set into eight category sets according to a nine-block location model, namely, eight direction areas: front, front right, right, rear right, rear, rear left, left, and front left by setting the first moving subject as a center. Then, the first communication device determines the moving subjects that are unrelated with the driving of the first moving subject based on the information of headings, locations, and driving speeds of two moving subjects, and then rule the moving subjects out from the first set to obtain the second set. Therefore, each of one or more moving subjects included in the second set is related to the motion of the first moving subject, that is, there exist a collision risk between the first moving subject and each moving subject in the second set.

It should be noted that the target classification algorithm in some embodiments of this application is content in the prior art. Details are not described in this application. In actual application, there are a plurality of target classification algorithms for determining, based on motion data of moving subjects, whether there is a risk of collision between the moving subjects. A specific calculation method is not limited in some embodiments of this application.

2022. The first communication device determines a predicted path of the first moving subject and a predicted path of a second moving subject, where the second moving subject is any one of the one or more moving subjects included in the second set.

In some embodiments of this application, after obtaining the second set, the first communication device determines a predicted path of the first moving subject and a predicted path of the second moving subject, where the second moving subject is any one of the one or more moving subjects included in the second set. In some embodiments of this application, the predicted path refers to a relationship between time and location information of the moving subject when the moving subject moves from a current moment.

In some embodiments, the first communication device may separately predict the predicted path of the first moving subject and the predicted path of the second moving subject by using the path prediction algorithm. For example, the first moving subject and the second moving subject are vehicles in the internet of vehicles scenario. The predicted path refers to a relationship between time and location information that is of the vehicle when the vehicle drives from a current moment. For example, in some embodiments of this application, the motion data of the moving subject includes information such as a driving speed, a course, a steering wheel angle, and GPS positioning of the moving subject, and the predicted path of the first moving subject that is predicted based on the path prediction algorithm is a predicted relationship between time and longitude and latitude coordinates of the first moving subject when the first moving subject moves from a current moment. For example, in some embodiments of this application, a function expression that is predicted by the first communication device by using a path prediction algorithm and based on the motion data of the first moving subject and that is of the time t and the longitude and latitude coordinates {x(t), y(t)} of the first moving subject when the first moving subject moves from the current moment is as follows:

$$x(t) = x_0 + 2R\sin\left(\frac{vt}{2R}\right)\sin\left(\frac{vt}{2R} + \theta\right), \text{ and } y(t) = y_0 + 2R\sin\left(\frac{vt}{2R}\right)\cos\left(\frac{vt}{2R} + \theta\right),$$

wherein, $x_0$ and $y_0$ are longitude and latitude coordinates of the first moving subject at the current moment, v is a current driving speed of the first moving subject, R is a prediction curvature, and θ is a current course of the first moving subject. It should be noted that $x_0$ and $y_0$ may be obtained by using the GPS, and the prediction curvature R is a ratio of the current speed of the first moving subject to a speed in a direction of a declination of the course.

Based on the function expression of the time and the longitude and latitude location coordinates of the first moving subject, the communication device of the first moving subject may determine values of longitude and latitude coordinates of the first moving subject at any moment.

Similarly, the first communication device may predict, by using the same path prediction algorithm and based on the motion data of the second moving subject, a longitude and latitude location {$x_d(t)$, $y_d(t)$} of the second moving subject when the second moving subject moves from the current moment.

It should be noted that in actual application, in some embodiments of this application, the path of the first moving subject and the path of each moving subject in the second set may be alternatively predicted by using a path prediction algorithm of another type. The foregoing is merely a simple example, and should not be construed as a limitation to this application.

2023. The first communication device determines a neighboring area of the first moving subject based on the predicted path of the first moving subject, the neighboring area is a braking area of the first moving subject.

In some embodiments of this application, after determining the predicted path of the first moving subject by using the path prediction algorithm, the first communication device determines, based on the predicted path, the neighboring area that is of the first moving subject in a driving process. In some embodiments of this application, the neighboring area is in a changing state in the driving process of the first moving subject.

For example, the first moving subject is a vehicle. The neighboring area of the first moving subject may be an area, which set the location of the first moving subject at the braking start moment as the center, the first moving subject moves at all angles on the horizontal surface from the time when it suddenly brakes forcibly in the driving status to a 0 speed status.

At least one embodiment of this application provides a method for determining the neighboring area of the first moving subject. For example, the predicted path of the first moving subject is the longitude and latitude coordinates $\{x(t), y(t)\}$ in step 2022. A distance formula of an edge point of the neighboring area and the first moving subject is:

$$Y=\cos(\theta_0)g(vg\Delta t+vg_0+0.5agt_0^2)+A,$$

wherein the $$\cos(\theta_0) = \frac{y_d(t) - y(t)}{\sqrt{[x_d(t) - x(t)]^2 + [y_d(t) - y(t)]^2}}.$$

In the foregoing formula, $\theta_0$ is a declination of an edge point location relative to a due north direction of the first moving subject, a is a deceleration of vehicle braking of the first moving subject, $\Delta t$ is a human reaction time, v is a current driving speed of the first moving subject, $t_0=v/a$, and A indicates a safe distance.

In some embodiments of this application, a, $\Delta t$, and A are preset fixed values. A vehicle user can modify and set the values according to an actual status. For example, a=−0.36 m/s$^2$, $\Delta t$=3 s, A=1 meter. Iteration is performed on the longitude and latitude coordinates of the first moving subject when the first moving subject drives in a future time period, and the distance formula Y of the edge point of the neighboring area of the first moving subject and the first moving subject, to obtain the neighboring area of the first moving subject at any moment in the driving process.

2024. The first communication device determines, based on the neighboring area and the predicted path of the second moving subject, whether the second moving subject is to enter the neighboring area of the first moving subject.

In some embodiments of this application, the first communication device determines, based on the neighboring area of the first moving subject and the predicted path of the second moving subject, whether the second moving subject will enter the neighboring area of the first moving subject. In some embodiments of this application, the first communication device may determine, based on the predicted path of the first moving subject and the predicted path of the second moving subject, whether a straight-line distance between the first moving subject and the second moving subject in a future time is always greater than a straight-line distance between the edge point of the neighboring area of the first moving subject and the first moving subject. The edge point is an intersection point between the neighboring area and a connection line between the first moving subject and the second moving subject, and is located between the first moving subject and the second moving subject. In some embodiments, it may be determined, according to the following calculation formula, whether the second moving subject will enter the neighboring area of the first moving subject:

$$Q(t) = \frac{\sqrt{[x_d(t) - x(t)]^2 + [y_d(t) - y(t)]^2}}{Y}.$$

If Q(t) is always greater than or equal to 1, the second moving subject will not enter the neighboring area of the first moving subject. Therefore, if Q(t) does not meet a condition of being always greater than or equal to 1, the first communication device determines that the second moving subject will enter the neighboring area of the first moving subject in a future time.

2025. If the second moving subject will enter the neighboring area of the first moving subject, the first communication device determines predicted time duration after which the second moving subject will enter the neighboring region, and determines whether the predicted time duration is less than a third threshold.

In some embodiments of this application, if the first communication device determines that the second moving subject will enter the neighboring area of the first moving subject in the future time, the first communication device further determines the predicted time duration after which the second moving subject is to enter the neighboring area, and determines whether the predicted time duration is less than the third threshold. In some embodiments of this application, the predicted time duration is time duration from a current moment to a moment when the second moving subject enters the neighboring area as predicted. For example, if the first communication device predicts that the second moving subject is to enter the neighboring area of the first moving subject after 10 s, the predicted time duration is 10 s.

2026. If the predicted time duration is less than the third threshold, the first communication device determines that a risk of collision between the second moving subject and the first moving subject meets the preset condition.

In some embodiments of this application, if the first communication device determines that the predicted time duration after which the second moving subject is to enter the neighboring area is less than the third threshold, the first communication device determines that the risk of collision between the second moving subject and the first moving subject meets the preset condition.

Figure 4:
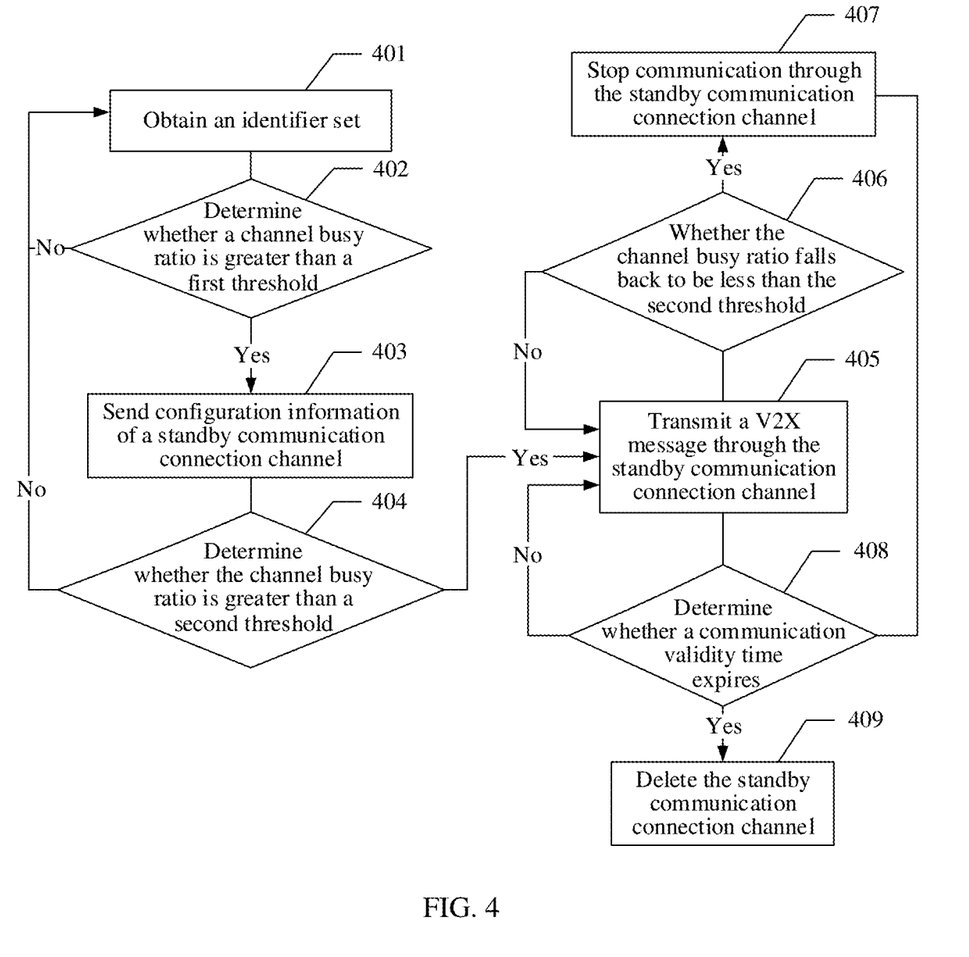
FIG. 4 is a flow chart of a V2X communication method according to at least one embodiment of this application.

FIG. 4 is a flow chart of a V2X communication method according to some embodiments of this application.

Referring to FIG. 4, the V2X communication method provided in some embodiments of this application may include the following steps.

401. A first communication device obtains an identification set, where the identification set includes one or more identifications, and a risk of collision between a moving subject corresponding to each identification and a first moving subject corresponding to the first communication device meets a preset condition.

This step can be further understood from the descriptions of step 101 in FIG. 1, the embodiments according to FIG. 2, and the embodiments according to FIG. 3. Details are not described herein again.

402. The first communication device determines whether the channel busy ratio is greater than the first threshold.

In some embodiments of this application, after obtaining the identification set, the first communication device determines whether the channel busy ratio is greater than the first threshold. When the channel busy ratio does not reach the first threshold, the first communication device obtains, every one cycle length, an identification set corresponding to a current moment. The cycle length may be preset, for example, may be 100 milliseconds.

403. When the channel busy ratio of the first communication device is greater than the first threshold, the first communication device sends configuration information of a standby communication connection channel to a second communication device, where the configuration information includes the identification set, and the configuration information is used for the second communication device to establish a standby communication connection channel with the first communication device after the second communication device determines that an identification of a moving subject corresponding to the second communication device belongs to the identification set.

In some embodiments of this application, when determining that the channel busy ratio is greater than the first threshold, the first communication device sends the configuration information of the standby communication connection channel to the second communication device. The configuration information includes the identification set and a communication validity time of the standby communication connection channel. In addition, the configuration information further includes one or more of identification information of the first moving subject, a communication protocol type (for example, a UDP or a TCP), a network connection type (for example, a 3G/4G/5G communication connection), a delay parameter, address information (IPv4, IPv6, or MAC), and the like. It should be noted that the configuration information may further include information of another type, for example, an enabling time of the standby communication connection channel, a port number, a vehicle password, an application ID, layer-2, or an IMEI.

This step can be further understood from the descriptions of step 102 in FIG. 1. Details are not described herein again.

404. The first communication device determines whether the channel busy ratio is greater than a second threshold.

In some embodiments of this application, after establishing the standby communication connection channel with the first communication device, the first communication device monitors a change of the channel busy ratio in real time, to determine whether the channel busy ratio reaches and is greater than the second threshold.

In some embodiments of this application, when the channel busy ratio is not greater than the second threshold, the first communication device obtains, every one cycle length, the identification set corresponding to the current moment, in other words, repeatedly performs content in step 401 to step 404.

405. When the channel busy ratio is greater than the second threshold, the first communication device transmits a V2X message to the second communication device through the standby communication connection channel, where the second threshold is greater than the first threshold.

In some embodiments of this application, when determining that the channel busy ratio is greater than the second threshold, the first communication device communicates with the second communication device through the standby communication connection channel established in step 403.

In some embodiments, in a process of obtaining the identification set, the first communication device records the predicted time duration after which the second communication device is to enter the neighboring area of the first communication device. Therefore, in some embodiments of this application, when the first communication device determines that the channel busy ratio is greater than the second threshold, the first communication device first may determine whether the predicted time duration expires, and after determining that the predicted time duration expires, the first communication device communicates with the second communication device through the standby communication connection channel.

This step can be further understood from the descriptions of step 103 in FIG. 1. Details are not described herein again.

406. The first communication device determines whether the channel busy ratio falls back to be less than the second threshold.

In some embodiments of this application, after communicating with the second communication device through the standby communication connection channel, the first communication device further monitors, in real time, whether the channel busy ratio falls back to be less than the second threshold. If the channel busy ratio is always greater than the second threshold, the first communication device continues to communicate with the second communication device through the standby communication connection channel.

407. If the channel busy ratio falls back to be less than the second threshold, the first communication device stops transmitting the V2X message to the second communication device through the standby communication connection channel.

In some embodiments of this application, after determining that the channel busy ratio falls back to be less than the second threshold, the first communication device disables the standby communication connection channel, and performs communication through an original V2X channel.

408. The first communication device determines whether the communication validity time expires.

In some embodiments of this application, the configuration information includes the communication validity time of the standby communication connection channel. After communicating with the second communication device through the standby communication connection channel, the first communication device determines whether the communication validity time expires.

In some embodiments, there is an association relationship between the communication validity time and the third threshold in step 2026 in FIG. 3. For example, if the third threshold is 10 seconds, the communication validity time may be the same as the third threshold and also is 10 seconds. In some embodiments of this application, there may also be another association relationship between the communication validity time and the third threshold. This is not limited in this application.

409. The first communication device deletes the standby communication connection channel if the communication validity time expires.

In some embodiments of this application, after communicating with the second communication device through the standby communication connection channel, the first communication device deletes the standby communication connection channel if determining that the communication validity time expires. In some embodiments of this application, after deleting the standby communication connection channel, the first communication device re-obtains the identification set corresponding to the current moment, and repeatedly performs step 401 to step 409.

In some embodiments of this application, the first communication device obtains, in real time, the identification set of the identification of the moving subjects whose risk of colliding with the first moving subject meets the preset condition, when the channel busy ratio reaches the first threshold, the first communication device establishes the standby communication connection channel with the corresponding moving subject in the identification set, and when the channel busy ratio reaches the relatively high second threshold, the first communication device transmits the V2X message through the pre-established standby communication connection channel, to ensure that when channel congestion occurs during V2X communication, moving subjects can still communicate with each other, thereby reducing a risk of a safety pre-determining failure of the moving subjects.

The foregoing describes the V2X communication method provided in some embodiments of this application. The following describes a V2X communication apparatus provided in some embodiments of this application, referring to FIG. 5, FIG. 5 is a schematic diagram of a V2X communication apparatus according to some embodiments of this application.

Figure 5:
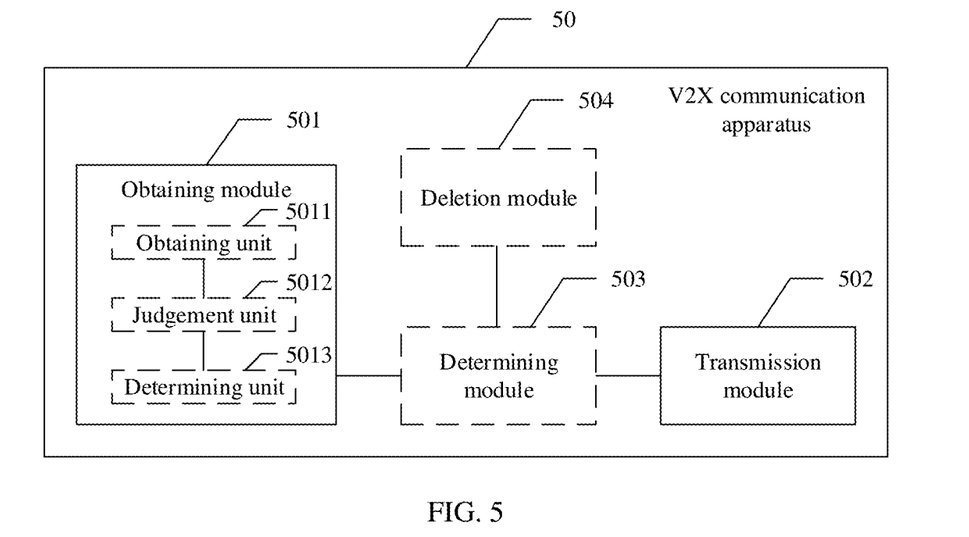
FIG. 5 is a schematic diagram of a V2X communication apparatus according to at least one embodiment of this application.

Referring to FIG. 5, the V2X communication apparatus 50 may include:

an obtaining module 501, configured to obtain an identification set, where the identification set includes one or more identifications, and a risk of collision between a moving subject corresponding to each identification and a first moving subject corresponding to a first communication device meets a preset condition; and a transmission module 502, configured to: when a channel busy ratio of the first communication device is greater than a first threshold, send configuration information of a standby communication connection channel to a second communication device, where the configuration information includes the identification set obtained by the obtaining module 501, and the configuration information is used for the second communication device to establish a standby communication connection channel with the first communication device after the second communication device determines that an identification of a moving subject corresponding to the second communication device belongs to the identification set; and transmit a V2X message to the second communication device through the standby communication connection channel when the channel busy ratio is greater than a second threshold, where the second threshold is greater than the first threshold.

In some embodiments, the obtaining module 501 includes: an obtaining unit 5011, configured to obtain target information, the target information includes motion data of the first moving subject and motion data of each moving subject in the first set; a judgment unit 5012, configured to determine, based on the target information obtained by the obtaining unit 5011, whether a risk of collision between the first moving subject and each moving subject in the first set meets the preset condition; and a determining unit 5013, configured to determine an identification of a moving subject that is in the first set determined by the judgment unit 5012 and whose risk of colliding with the first moving subject meets the preset condition, to obtain the identification set.

In some embodiments, the judgment unit 5012 is configured to determine, based on the target information, a moving subject that is in the first set and that has a risk of colliding with the first moving subject, to obtain a second set; determine a predicted path of the first moving subject and a predicted path of a second moving subject, where the second moving subject is any one of one or more moving subjects included in the second set; determine a neighboring area of the first moving subject based on the predicted path of the first moving subject, where the neighboring area is a braking area of the first moving subject; determine, based on the predicted path of the second moving subject and the neighboring area, whether the second moving subject is to enter the neighboring area; if the second moving subject is to enter the neighboring area, determine predicted time duration after which the second moving subject is to enter the neighboring area, and determine whether the predicted time duration is less than a third threshold; and if the predicted time duration is less than the third threshold, determine that a risk of collision between the second moving subject and the first moving subject meets the preset condition.

In some embodiments, the V2X communication apparatus 50 may further include: a determining module 503, configured to: when the channel busy ratio is greater than the second threshold, determine whether the predicted time duration expires. Correspondingly, the transmission module 502 is configured to: when the determining module 502 determines that the prediction time arrives, transmit the V2X message to the second communication device through the standby communication connection channel.

In some embodiments, the configuration information further includes an enabling time of the standby communication connection channel. The V2X communication apparatus 50 further includes: a determining module 503, configured to: when the channel busy ratio is greater than the second threshold, determine whether the enabling time arrives. Correspondingly, the transmission module 502 is configured to: when the determining module 503 determines that the enabling time arrives, transmit the V2X message to the second communication device through the standby communication connection channel.

In some embodiments, the configuration information further includes a communication validity time, and the determining module 503 is further configured to: after the transmission module 502 transmits the V2X message to the second communication device through the standby communication connection channel, determines whether the communication validity time expires. The V2X communication apparatus 50 further includes a deletion module 504, configured to: when the determining module 503 determines that the communication validity time expires, delete the standby communication connection channel. In some embodiments, the described modules and units in FIG. 5 are configured by hardware and/or by software executed on hardware. For example, the obtaining module 501, with the obtaining unit 5011, judgment unit 5012, and determining unit 5013, the determining module 503 and the deletion module 504 are implemented by at least one processor, whereas the transmission module 502 is implemented by at least one hardware communication interface, as described with respect to FIG. 6. The at least one processor is configured or programed to perform, and/or instruct the at least one hardware communication interface to perform, one or more of the methods described with respect to FIGS. 1-4.

In some embodiments, the configuration information further includes one or more of identification information of the first moving subject, a communication protocol type, a connection protocol type, a delay parameter, and address information.

Figure 6:
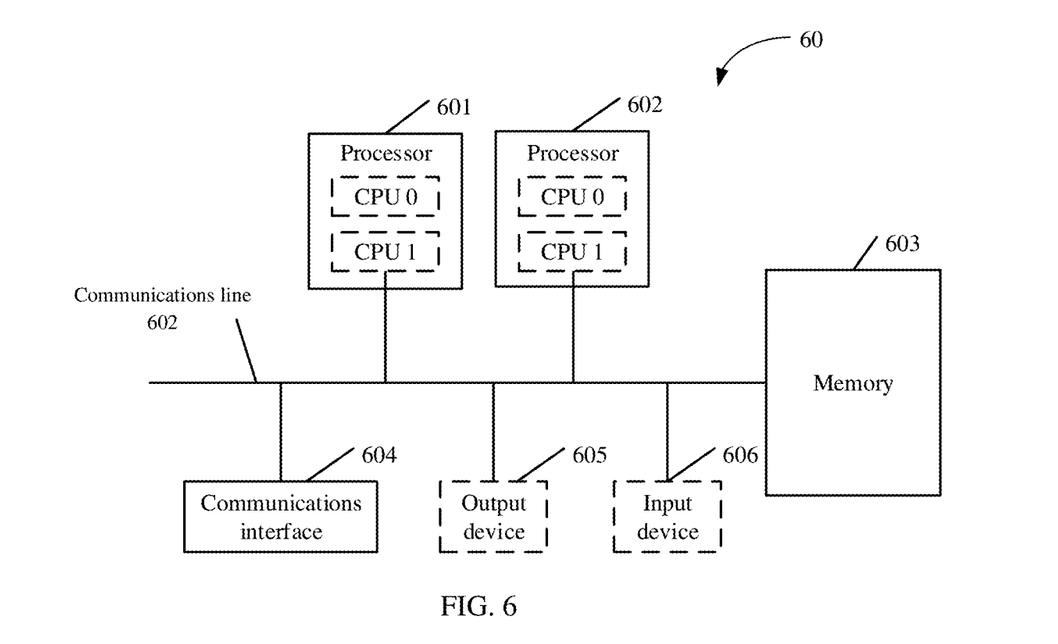
FIG. 6 is a schematic hardware structural diagram of a communication device according to at least one embodiment of this application.

Some embodiments of this application further provide a schematic structural diagram of hardware of a communication device, to implement the V2X communication method to be implemented by the first communication device in the foregoing embodiments, referring to FIG. 6.

Referring to FIG. 6, the hardware device 60 may include at least one processor 601, a communication line 602, a memory 603, and at least one hardware communication interface 604. The processor 601 may be a general-purpose central processing unit (central processing unit, CPU), a microprocessor, an application-specific integrated circuit (application-specific integrated circuit, server IC), or one or more integrated circuits configured to control program execution of the solution of this application.

The communication line 602 may include a path for transmitting information between the foregoing components.

The hardware communication interface 604 comprises any transceiver-type apparatus, to communicate with another device or a communication network such as the Ethernet, a radio access network (radio access network, RAN), or a wireless local area network (wireless local area networks, WLAN).

The memory 603 may be a read-only memory (read-only memory, ROM) or another type of static storage device that can store static information and instructions, a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another optical disk storage, an optical disc storage (including a compressed optical disc, a laser disc, an optical disc, a digital versatile optical disc, a Blu-ray disc, or the like), a magnetic disk storage medium, or another magnetic storage device, or any other medium that can be used to carry or store expected program code in a form of an instruction or a data structure and that can be accessed by a computer, but no limitation is set thereto. The memory may exist independently and is connected to the processor through the communication line 602. Alternatively, the memory may be integrated with the processor.

The memory 603 is configured to store computer executable instructions for performing the solutions in this application, and execution of the computer executable instructions are controlled by the processor 601. The processor 601 is configured to execute the computer-executable instructions stored in the memory 603, to implement the V2X communication method provided in some embodiments of this application.

In some embodiments, the computer-executable instructions may also be referred to as application program code. This is not limited in some embodiments of this application.

In a specific implementation, in at least one embodiment, the processor 601 may include one or more CPUs, for example, a CPU 0 and a CPU 1 in FIG. 6.

In a specific implementation, in at least one embodiment, the communication device 60 may include a plurality of processors such as the processor 601 in FIG. 6 and a processor 608. Each of these processors may be a single-core (single-CPU) processor, or may be a multi-core (multi-CPU) processor. The processor herein may refer to one or more devices, circuits, and/or processing cores configured to process data (for example, computer program instructions).

In a specific implementation, in at least one embodiment, the V2X communication device 60 may further include an output device 605 and an input device 606. The output device 605 communicates with the processor 601, and may display information in a plurality of manners. For example, the output device 605 may be a liquid crystal display (LCD), a light-emitting diode (LED) display device, a cathode ray tube (CRT) display device, or a projector. The input device 606 communicates with the processor 601, and may receive an input of a user in a plurality of manners. For example, the input device 606 may be a mouse, a keyboard, a touchscreen device, a sensing device, or the like.

All or some of the foregoing embodiments may be implemented by software, hardware, firmware, or any combination thereof. When being implemented by using the software, all or some of the embodiments may be implemented in a form of a computer program product.

The computer program product includes one or more computer instructions. When the computer program instructions are loaded and executed on the computer, the procedure or functions according to some embodiments of the instant application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

Some embodiments of this application further provide a non-transitory computer-readable storage medium. The computer-readable storage medium stores a computer program. When the program is executed by a processor, a procedure related to the communication device in the V2X communication method provided in the foregoing method embodiments may be implemented.

Some embodiments of this application further provide a chip system. The chip system includes a processor, configured to support a communication device entity in implementing the foregoing V2X communication method. In a possible design, the chip system further includes a memory. The memory is configured to store program instructions and data of the communication device. The chip system may include a chip, or may include a chip and another discrete device. This is not limited in some embodiments of this application.

All or some of the foregoing embodiments may be implemented by software, hardware, firmware, or any combination thereof. When being implemented by using the software, all or some of the embodiments may be implemented in a form of a computer program product.

The computer program product includes one or more computer instructions. When the computer program instructions are loaded and executed on the computer, the procedure or functions according to some embodiments of the instant application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

A person of ordinary skill in the art may understand that all or some of the steps of the methods in the foregoing embodiments may be implemented by a program instructing related hardware. The program may be stored in a non-transitory computer-readable storage medium. The storage medium may include: a ROM, a RAM, a magnetic disk, or an optical disc.

The V2X communication method, the corresponding apparatuses, and the non-transitory computer-readable medium provided in some embodiments of the instant application are described in detail above. The principle and implementation of some embodiments of the instant application are described herein through specific examples. The description about some embodiments of the instant application is merely provided to help understand the method and core ideas of the instant application. In addition, persons of ordinary skill in the art can make variations and modifications in terms of the specific implementations and application scopes according to the described ideas of the instant application. Therefore, the content of specification shall not be construed as a limit to the appended claims.

The invention claimed is:

1. A vehicle to everything (V2X) communication method, comprising:
   obtaining, by a first communication device, an identification set, wherein
      the identification set comprises one or more identifications, and
      a risk of collision between a moving subject corresponding to each identification in the identification set and a first moving subject corresponding to the first communication device meets a preset condition;
   when a channel busy ratio of the first communication device is greater than a first threshold, sending, by the first communication device, a configuration information of a standby communication connection channel to a second communication device, wherein
      the configuration information comprises the identification set, and
      the configuration information is for the second communication device to establish the standby communication connection channel with the first communication device upon the second communication device determining that an identification of a moving subject corresponding to the second communication device belongs to the identification set; and
   transmitting, by the first communication device, a V2X message to the second communication device through the standby communication connection channel when the channel busy ratio is greater than a second threshold, wherein the second threshold is greater than the first threshold.

2. The method according to claim 1, wherein the obtaining, by the first communication device, the identification set comprises:
   obtaining, by the first communication device, a target information, wherein the target information comprises motion data of the first moving subject and motion data of each of one or more moving subjects in a first set;
   determining, by the first communication device based on the target information, whether a risk of collision between the first moving subject and each moving subject in the first set meets the preset condition; and
   determining, by the first communication device, an identification of a moving subject that is in the first set and whose risk of colliding with the first moving subject meets the preset condition, to obtain the identification set.

3. The method according to claim 2, wherein the determining, by the first communication device based on the target information, whether a risk of collision between the first moving subject and each moving subject in the first set meets the preset condition, comprises:
   determining, by the first communication device based on the target information, a moving subject that is in the first set and that has a risk of colliding with the first moving subject, to obtain a second set;
   determining, by the first communication device, a predicted path of the first moving subject and a predicted path of a second moving subject, wherein the second moving subject is any one of one or more moving subjects in the second set;
   determining, by the first communication device, a neighboring area of the first moving subject based on the predicted path of the first moving subject, wherein the neighboring area is a braking area of the first moving subject;
   determining, by the first communication device based on the predicted path of the second moving subject and the neighboring area, whether the second moving subject is to enter the neighboring area;
   in response to determining that the second moving subject is to enter the neighboring area, determining, by the first communication device,
      a predicted time duration after which the second moving subject is to enter the neighboring area, and
      whether the predicted time duration is less than a third threshold; and
   in response to determining that the prediction time is less than the third threshold, determining, by the first communication device, that a risk of collision between the second moving subject and the first moving subject meets the preset condition.

4. The method according to claim 3, wherein
   before the transmitting, by the first communication device, a V2X message to the second communication device through the standby communication connection channel, the method further comprises:
      when the channel busy ratio is greater than the second threshold, determining, by the first communication device, whether the predicted time duration expires, and
   the transmitting, by the first communication device, a V2X message to the second communication device through the standby communication connection channel is performed when the channel busy ratio is greater than the second threshold and the predicted time duration expires.

5. The method according to claim 3, wherein
   the configuration information further comprises an enabling time of the standby communication connection channel,
   before the transmitting, by the first communication device, a V2X message to the second communication device through the standby communication connection channel, the method further comprises:

when the channel busy ratio is greater than the second threshold, determining, by the first communication device, whether the enabling time arrives, and the transmitting, by the first communication device, a V2X message to the second communication device through the standby communication connection channel is performed when the channel busy ratio is greater than the second threshold and the enabling time arrives.

6. The method according to claim 5, wherein the configuration information further comprises a communication validity time, and after the transmitting, by the first communication device, a V2X message to the second communication device through the standby communication connection channel, the method further comprises:

determining, by the first communication device, whether the communication validity time expires; and in response to determining that the communication validity time expires, deleting the standby communication connection channel.

7. The method according to claim 6, wherein the configuration information further comprises one or more of identification information of the first moving subject, a communication protocol type, a connection protocol type, a delay parameter, and address information.

8. A vehicle to everything (V2X) communication apparatus, wherein the apparatus comprises at least one processor and at least one hardware communication interface, wherein the at least one processor is configured to:

obtain an identification set, wherein the identification set comprises one or more identifications, and a risk of collision between a moving subject corresponding to each identification and a first moving subject corresponding to a first communication device meets a preset condition;

when a channel busy ratio of the first communication device is greater than a first threshold, instruct the at least one hardware communication interface to send configuration information of a standby communication connection channel to a second communication device, wherein the configuration information comprises the identification set, and the configuration information is for the second communication device to establish the standby communication connection channel with the first communication device upon the second communication device determining that an identification of a moving subject corresponding to the second communication device belongs to the identification set, and instruct the at least one hardware communication interface to transmit a V2X message to the second communication device through the standby communication connection channel when the channel busy ratio is greater than a second threshold, wherein the second threshold is greater than the first threshold.

9. The apparatus according to claim 8, wherein the at least one processor is further configured to:

obtain target information, wherein the target information comprises motion data of the first moving subject and motion data of each of one or more moving subjects in a first set, determine, based on the target information, whether a risk of collision between the first moving subject and each moving subject in the first set meets the preset condition, and determine an identification of a moving subject that is in the first set and whose risk of colliding with the first moving subject meets the preset condition, to obtain the identification set.

10. The apparatus according to claim 9, wherein the at least one processor is further configured to:

determine, based on the target information, a moving subject that is in the first set and that has a risk of colliding with the first moving subject, to obtain a second set, determine a predicted path of the first moving subject and a predicted path of a second moving subject, wherein the second moving subject is any one of one or more moving subjects in the second set, determine a neighboring area of the first moving subject based on the predicted path of the first moving subject, wherein the neighboring area is a braking area of the first moving subject, determine, based on the predicted path of the second moving subject and the neighboring area, whether the second moving subject is to enter the neighboring area, in response to determining that the second moving subject is to enter the neighboring area, determine predicted time duration after which the second moving subject is to enter the neighboring area, and whether the predicted time duration is less than a third threshold, and in response to determining that the predicted time duration is less than the third threshold, determine that a risk of collision between the second moving subject and the first moving subject meets the preset condition.

11. The apparatus according to claim 10, wherein the at least one processor is further configured to:

when the channel busy ratio is greater than the second threshold, determine whether the predicted time duration expires, and instruct the at least one hardware communication interface to transmit the V2X message to the second communication device through the standby communication connection channel when the channel busy ratio is greater than the second threshold and the predicted time duration expires.

12. The apparatus according to claim 10, wherein the configuration information further comprises an enabling time of the standby communication connection channel, and:

the at least one processor is further configured to, when the channel busy ratio is greater than the second threshold, determine whether the enabling time arrives, and instruct the at least one hardware communication interface to transmit the V2X message to the second communication device through the standby communication connection channel upon determining that the enabling time arrives.

13. The apparatus according to claim 12, wherein the configuration information further comprises a communication validity time, and the at least one processor is further configured to, after transmitting the V2X message to the second communication device through the standby communication connection channel, determine whether the communication validity time expires, and delete the standby communication connection channel upon determining that the communication validity time expires.

14. The apparatus according to claim 13, wherein the configuration information further comprises one or more of identification information of the first moving subject, a communication protocol type, a connection protocol type, a delay parameter, and address information.

15. A non-transitory computer-readable storage medium, wherein the non-transitory computer-readable storage medium stores instructions, and the instructions, when run on a processor, cause:

obtaining, by a first communication device, an identification set, wherein the identification set comprises one or more identifications, and a risk of collision between a moving subject corresponding to each identification in the identification set and a first moving subject corresponding to the first communication device meets a preset condition, when a channel busy ratio of the first communication device is greater than a first threshold, sending, by the first communication device, a configuration information of a standby communication connection channel to a second communication device, wherein the configuration information comprises the identification set, and the configuration information is for the second communication device to establish the standby communication connection channel with the first communication device upon the second communication device determining that an identification of a moving subject corresponding to the second communication device belongs to the identification set, and transmitting, by the first communication device, a V2X message to the second communication device through the standby communication connection channel when the channel busy ratio is greater than a second threshold, wherein the second threshold is greater than the first threshold.

* * * * *

UNITED STATES PATENT AND TRADEMARK OFFICE
CERTIFICATE OF CORRECTION

PATENT NO. : 11,751,039 B2
APPLICATION NO. : 17/574095
DATED : September 5, 2023
INVENTOR(S) : Hao Zhang Page 1 of 1

It is certified that error appears in the above-identified patent and that said Letters Patent is hereby corrected as shown below:

In the Specification

Column 13, Line 12-25 should be replaced with the paragraph below:
At least one embodiment of this application provides a method for determining the neighboring area of the first moving subject. For example, the predicted path of the first moving subject is the longitude and latitude coordinates {x(t), y(t)} in step 2022. A distance formula of an edge point of the neighboring area and the first moving subject is:

$$Y = \text{Cos}(\theta_0) g \left( v g \Delta t + v g_0 + 0.5 a g_0^2 \right) + A,$$

wherein the $$\text{Cos}(\theta_0) = \frac{y_d(t) - y(t)}{\sqrt{[x_d(t) - x(t)]^2 + [y_d(t) - y(t)]^2}}.$$

Signed and Sealed this
Thirty-first Day of October, 2023

*Katherine Kelly Vidal*
*Director of the United States Patent and Trademark Office*